United States Patent
Munger et al.

(10) Patent No.: US 12,417,290 B2
(45) Date of Patent: Sep. 16, 2025

(54) REVOKED FIRMWARE ROLLBACK PREVENTION

(71) Applicant: Dell Products L.P., Round Rock, TX (US)

(72) Inventors: William C. Munger, Round Rock, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 17/869,848

(22) Filed: Jul. 21, 2022

(65) Prior Publication Data

US 2024/0028730 A1   Jan. 25, 2024

(51) Int. Cl.
    *G06F 8/65* (2018.01)
    *G06F 21/57* (2013.01)

(52) U.S. Cl.
    CPC .............. *G06F 21/572* (2013.01); *G06F 8/65* (2013.01); *G06F 2221/033* (2013.01)

(58) Field of Classification Search
    CPC .............. G06F 21/572; G06F 8/60–66; G06F 2221/033; G06F 8/65; G06F 8/654
    See application file for complete search history.

(56) References Cited

U.S. PATENT DOCUMENTS

| | | | | |
|---|---|---|---|---|
| 5,742,829 A | * | 4/1998 | Davis | G06F 8/65 717/178 |
| 6,996,817 B2 | * | 2/2006 | Birum | H04L 67/06 707/999.203 |
| 8,745,612 B1 | * | 6/2014 | Semenzato | G06F 8/65 717/170 |
| 10,003,612 B1 | * | 6/2018 | Hocker | H04L 9/0891 |
| 2011/0154135 A1 | * | 6/2011 | Tyhurst | G06F 8/61 717/177 |
| 2017/0103192 A1 | * | 4/2017 | Hussey | G06F 8/71 |
| 2019/0179631 A1 | * | 6/2019 | Benedetti | G06F 9/44505 |
| 2020/0019397 A1 | * | 1/2020 | Duran | H04L 9/3247 |
| 2020/0356357 A1 | * | 11/2020 | Narasimhan | G06F 15/167 |
| 2021/0004466 A1 | * | 1/2021 | Nadarajah | G06F 21/572 |
| 2021/0048997 A1 | | 2/2021 | Samuel et al. | |

(Continued)

OTHER PUBLICATIONS

Eizenhefer et al., "Secure CRTM/BIOS Update Through Allowed Versions List", published by ip.com, an IP.com Prior Art Database Technical Disclosure, pp. 1-7 (Year: 2006).*

*Primary Examiner* — Marina Lee
(74) *Attorney, Agent, or Firm* — Larson Newman, LLP

(57) ABSTRACT

An information handling system includes multiple components including a first component. The first component includes a protected memory and a basic input/output system (BIOS). The protected memory stores a revoked versions list. The BIOS initializes a firmware update for a firmware image having a firmware version. The BIOS scans the revoked versions list for the firmware version of the firmware image. In response to the firmware version not being located within the revoked versions list, the BIOS completes the firmware update, and determines whether a revoked firmware version is included in the firmware update. In response to the revoked firmware version being included in the firmware update, the BIOS adds an entry in the revoked versions list. The entry is associated with the revoked firmware version included in the firmware update.

20 Claims, 4 Drawing Sheets

(56) References Cited

U.S. PATENT DOCUMENTS

| | | | |
|---|---|---|---|
| 2021/0224061 A1* | 7/2021 | Pillilli | G06F 9/4403 |
| 2022/0083324 A1 | 3/2022 | Singh et al. | |
| 2023/0315432 A1* | 10/2023 | Chabaud | G06F 8/71 717/168 |
| 2024/0338197 A1* | 10/2024 | Horovitz | G06F 8/62 |

* cited by examiner

REVOKED FIRMWARE ROLLBACK PREVENTION

FIELD OF THE DISCLOSURE

The present disclosure generally relates to information handling systems, and more particularly relates to revoked firmware rollback prevention.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system has a first component that includes a protected memory and a basic input/output system (BIOS). The protected memory stores a revoked versions list. The BIOS initializes a firmware update for a firmware image having a firmware version. The BIOS scans the revoked versions list for the firmware version of the firmware image. In response to the firmware version not being located within the revoked versions list, the BIOS completes the firmware update, and determines whether a revoked firmware version is included in the firmware update. In response to the revoked firmware version being included in the firmware update, the BIOS adds an entry in the revoked versions list. The entry is associated with the revoked firmware version included in the firmware update.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
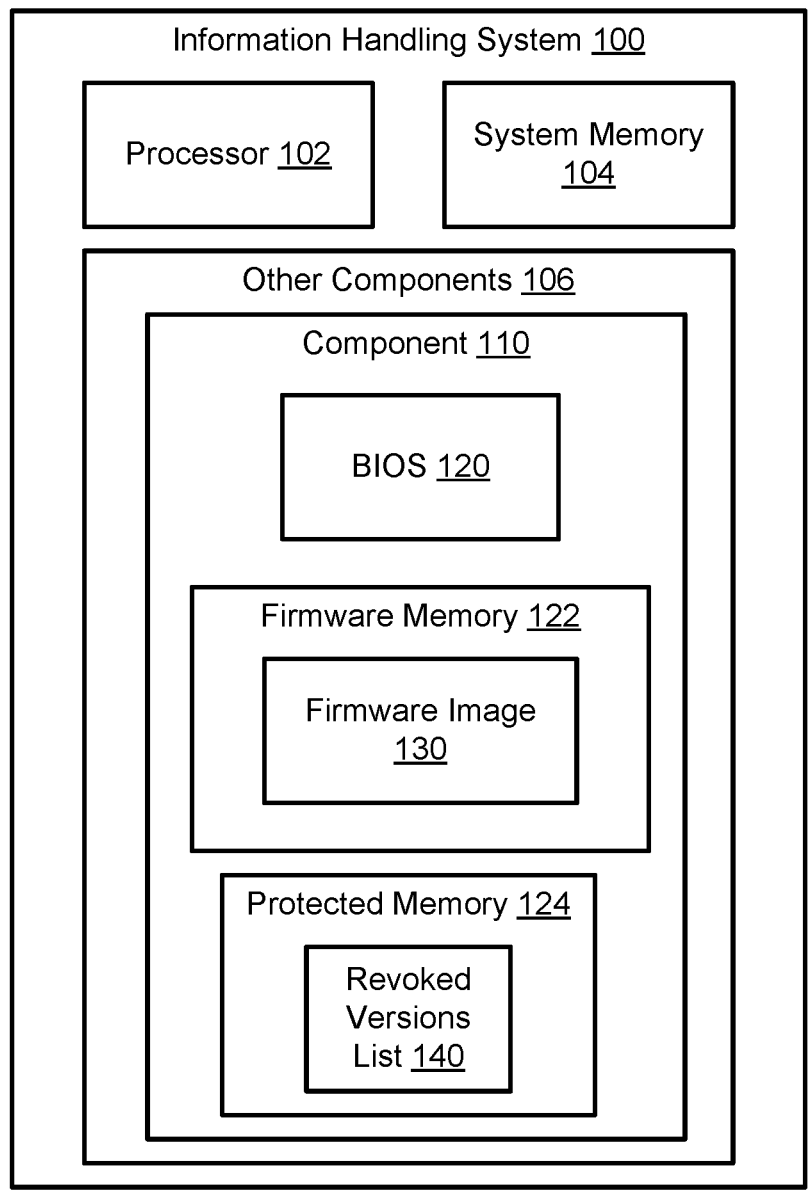
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a processor 102, system memory 104, and other components 106. Other components 106 may include any number of components, but a single component 110 has been illustrated for clarity and brevity. Component 110 includes a basic input/output system (BIOS) 120, a firmware memory 122, and a protected memory. Firmware memory 122 can include a non-volatile random access memory (NVRAM), and is configured to store a firmware image 130. Firmware image 130 generally includes a collection of firmware routines, device drivers, and other software programs. Protected memory 124 may store a revoked versions list 140. Protected memory 124 may be any suitable memory that secures the stored data from unauthorized access. In this situation, unauthorized software/firmware is prevented from accessing the data or content within protected memory 124. In an example, the revoked versions list 140 may be any suitable secured data such as a unified extensible firmware interface (UEFI) authenticated variable. In an example, the other components 106 may include, but are not limited to, network interface cards, memory drives, memory controllers, and redundant array of independent disks (RAID) controllers. Information handling system 100 may include additional components without varying from the scope of this disclosure.

In certain examples, while FIG. 1 illustrates only a single component 110 with a single firmware memory 122, a single firmware image 130, a single BIOS 120, a single protected memory 124, and a single revoked versions list 140, each of the other components 106 may include a firmware memory, a firmware image 130, a BIOS, a protected memory, and a revoked versions list. In this situation, firmware updates for a particular component may be provided to that component so that the BIOS of the component may perform the firmware update on the component. For clarity and brevity, firmware updates and revoked versions list 140 will be described only with respect to firmware image 130 and revoked versions list 140, but the same operations may be performed in each of the other components 106 without varying from the scope of this disclosure.

During operation of information handling system 100, one or more firmware updates may be performed by BIOS 120. In certain examples, firmware updates for each of the other components 106 may be managed by different entities, and each of these different entities may also be different than the entity to manage firmware updates for main devices within information handling system 100. In an example, a security vulnerability or security flaw may be determined for firmware image 130, such that the firmware image may need to be updated to correct the security vulnerability.

In previous information handling systems, if a security vulnerability is found in a firmware of a component a firmware vendor or entity may provide a new firmware version to correct or remove the vulnerability. In response to the new or updated firmware version being received, the previous information handling system may perform the firmware update to install the new version of the firmware. However, the previous information handling systems may have another potential attack vector, such as an attacker may be able to downgrade the firmware to the version with the known vulnerability and then exploit the vulnerability. Information handling system 100 may be improved by processor 102 and BIOS 120 preventing a rollback or downgrading of a firmware version from a currently installed version to a version having a known vulnerability as will be described herein.

During a firmware update, BIOS 120 may scan revoked versions list 140 within protected memory 124 for the firmware version of the initialized firmware update. In an example, a signed update utility within BIOS 120 may perform the scan of revoked versions list 140. In an example, the firmware update package may include an identity of revoked firmware versions. In certain examples, a revoked firmware version may be identified by a firmware version number or the like. In an example, the revoked firmware version may be any previous firmware version, such as a currently installed firmware version being replaced by the firmware update or any other previous firmware version no matter how many updates have been made since that version. In an example, revoked versions list 140 may contain one or more revoked version numbers including three or four previous version numbers. In this example, the firmware versions in revoked version list 140 are never removed even when new revoked firmware versions are added to the revoked version list.

Based on the scan of revoked versions list 140, BIOS 120 may determine whether the firmware version for the initialized firmware update is located within the revoked versions list of protected memory 124. If the firmware version for the initialized firmware update is located within the protected memory, BIOS 120 may abort the firmware update. If the firmware version for the initialized firmware update is not located within the protected memory, BIOS 120 may perform one or more operations to complete the firmware update. For example, one of the operations may include BIOS 120 creating one or more entries for any newly revoked firmware versions. In this example, the firmware update may include the one or more revoked firmware version numbers. After the new entries have been created, BIOS 120 may store the new entries in revoked versions list 140. These new entries and all other entries in revoked versions list 140 may be utilized by BIOS 120 during any future firmware updates.

In certain examples, a notification of a firmware vulnerability may be provided to information handling system 100, to a user of the information handling system, or the like. In an example, the notification may be received by information handling system 100 in any suitable manner, such as a push notification from a firmware vulnerability tracking component, an input from a user of the information handling system, or the like. The firmware vulnerability notification may include any suitable data such as the firmware version number associated with the vulnerability, or the like. Based on the data in the notification, processor 102 or a processor of component 110 may create a revoked firmware entry associated with the firmware vulnerability. Processor 102 may provide the revoked firmware entry to component 110, which in turn may add the entry to revoked versions list 140.

In an example, the new entry is added to an authenticated UEFI variable of revoked versions list 140 in any suitable manner. In particular, the authenticated UEFI variable, such as revoked versions list 140, may be protected by private-public key pairs. In this situation, a private key for the authenticated UEFI variable may be stored in any suitable memory. For example, the private key may be stored within a secure memory in a trust platform manager (TPM) of information handling system 100, within a key management system (KMS), within a server including a hardware security module (HSM), or the like. In an example, the private key may be utilized to modify, add, or remove revoked firmware versions from the UEFI variable, such as revoked versions list 140. Based on the private key for the authenticated UEFI variable, a user may utilize the private key to revoke firmware versions that have a vulnerability. In this example, the user may immediately revoke firmware versions identified with vulnerability without waiting for an entity associated with a component of the firmware to send a firmware update.

Figure 2:
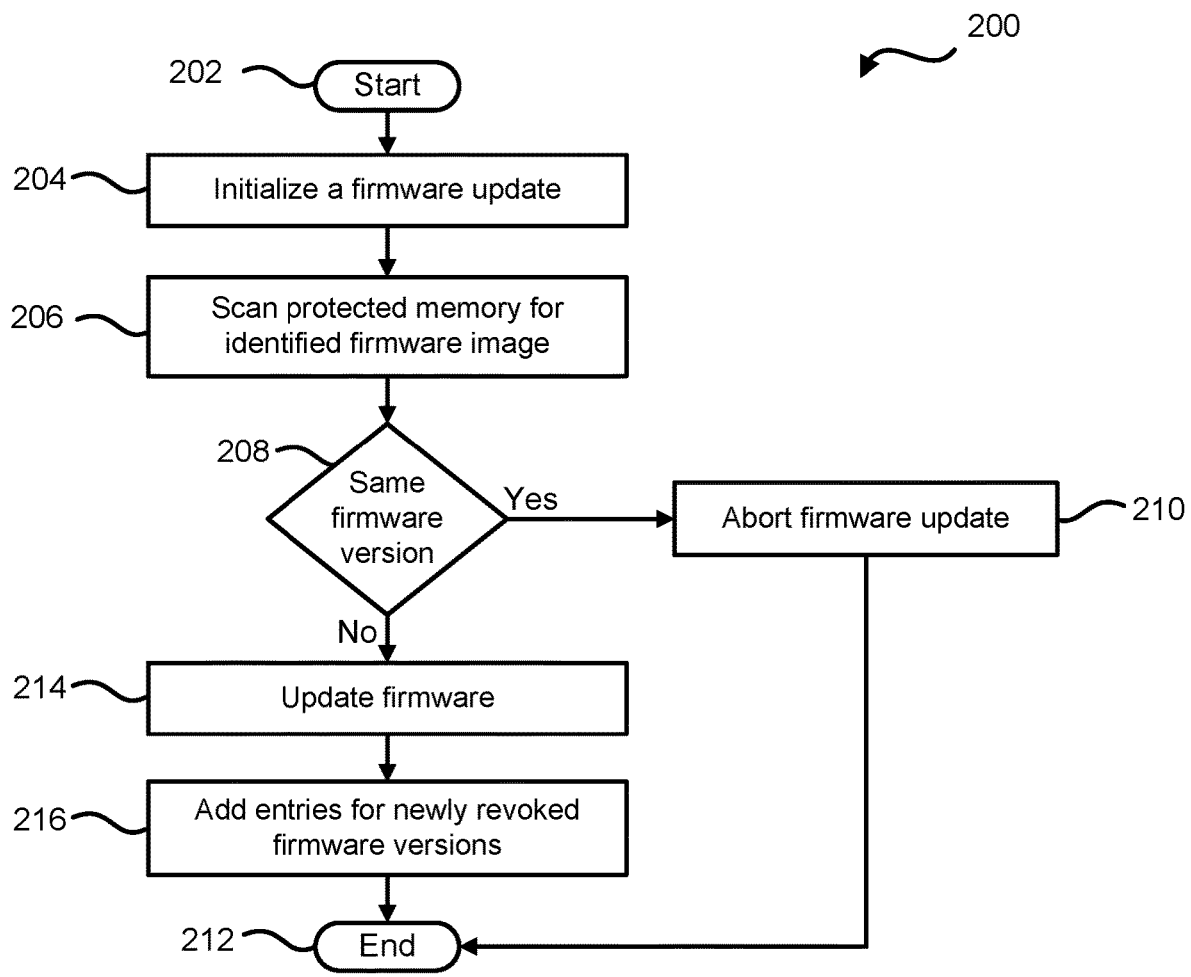
FIG. 2 is a flow diagram of a method for preventing a firmware rollback to revoked firmware versions according to at least one embodiment of the present disclosure.

FIG. 2 shows a method 200 for preventing a firmware rollback to revoked firmware versions according to at least one embodiment of the present disclosure, starting at block 202. In an example, the method 200 may be performed by any suitable component including, but not limited to, a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, a firmware update is initialized. In an example, the firmware update may be for firmware of any suitable component within an information handling system including, but not limited to, a network interface card, a memory drive, a memory controller, and a redundant array of independent disks (RAID) controller. In certain examples, the firmware update for the component may be managed by a different entity as compared to the entity to manage motherboard processor firmware updates.

At block 206, a protected memory is scanned for the firmware version of the initialized firmware update. In certain examples, the protected memory may be any suitable type of memory, such as a non-volatile random access memory (NVRAM) or the like, which prevents unauthorized modification of the memory contents. In an example, a list of revoked firmware versions may be stored in the protected memory of the information handling. The list of revoked firmware versions may be stored as a universal extensible firmware interface (UEFI) authenticated variable in the protected memory.

At block 208, a determination is made whether a firmware version for the initialized firmware update is located within the protected memory, such as in the list of revoked firmware versions. If the firmware version for the initialized firmware update is located within the protected memory, the firmware update is aborted at block 210 and the flow ends at block 212.

If the firmware version for the initialized firmware update is not located within the protected memory, the firmware update is completed at block 214. In an example, the firmware update package may include an identity of revoked firmware versions. In certain examples, a revoked firmware version may be identified by a firmware version number or the like. In an example, the revoked firmware version may be any previous firmware version, such as a currently installed firmware version being replaced by the firmware update or any other previous firmware version no matter how many updates have been made since that version. At block 216, entries for any newly revoked firmware versions are added to the protected memory, such as in the list of revoked firmware versions, and the flow ends at block 212.

Figure 3:
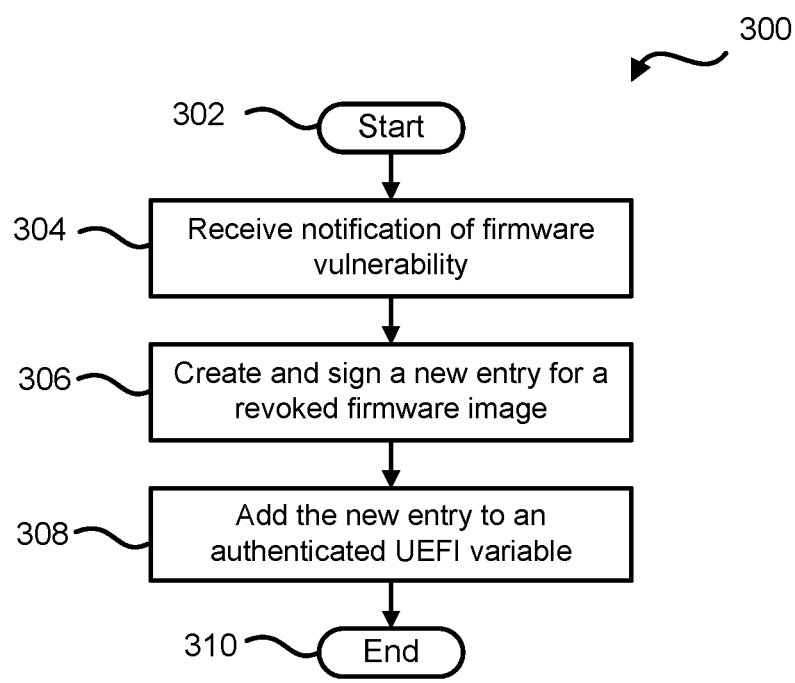
FIG. 3 is a flow diagram of another method for preventing a firmware rollback to revoked firmware versions according to at least one embodiment of the present disclosure.

FIG. 3 shows a method 300 for preventing a firmware rollback to revoked firmware versions according to at least one embodiment of the present disclosure, starting at block 302. In an example, the method 300 may be performed by any suitable component including, but not limited to, a processor, such as processor 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a notification of a firmware vulnerability is received. In certain examples, the notification may be received in any suitable manner, such as a push notification from a firmware vulnerability tracking component, an input from a user of the information handling system, or the like. At block 306, a new entry for a revoked firmware image version is created and signed within the information handling system. At block 308, the new entry is added to an authenticated UEFI variable, and the flow ends at block 310.

In an example, the new entry is added to the authenticated UEFI variable in any suitable manner or set of operations. In particular, the authenticated UEFI variable may be protected by private-public key pairs. In this situation, a user of the information handling system needs to hold the private key for the authenticated UEFI variable before the user may modify, add, or remove revoked firmware versions from the UEFI variable list. Based on the user holding the private key for the authenticated UEFI variable, the user may utilize the private key to sign new entries for the authenticated UEFI variable. The user may then add such signed entries to the variable, thus revoking firmware versions that have a vulnerability. In this example, the user may immediately revoke firmware versions identified with vulnerability without waiting for an entity associated with a component of the firmware to send a firmware update.

Figure 4:
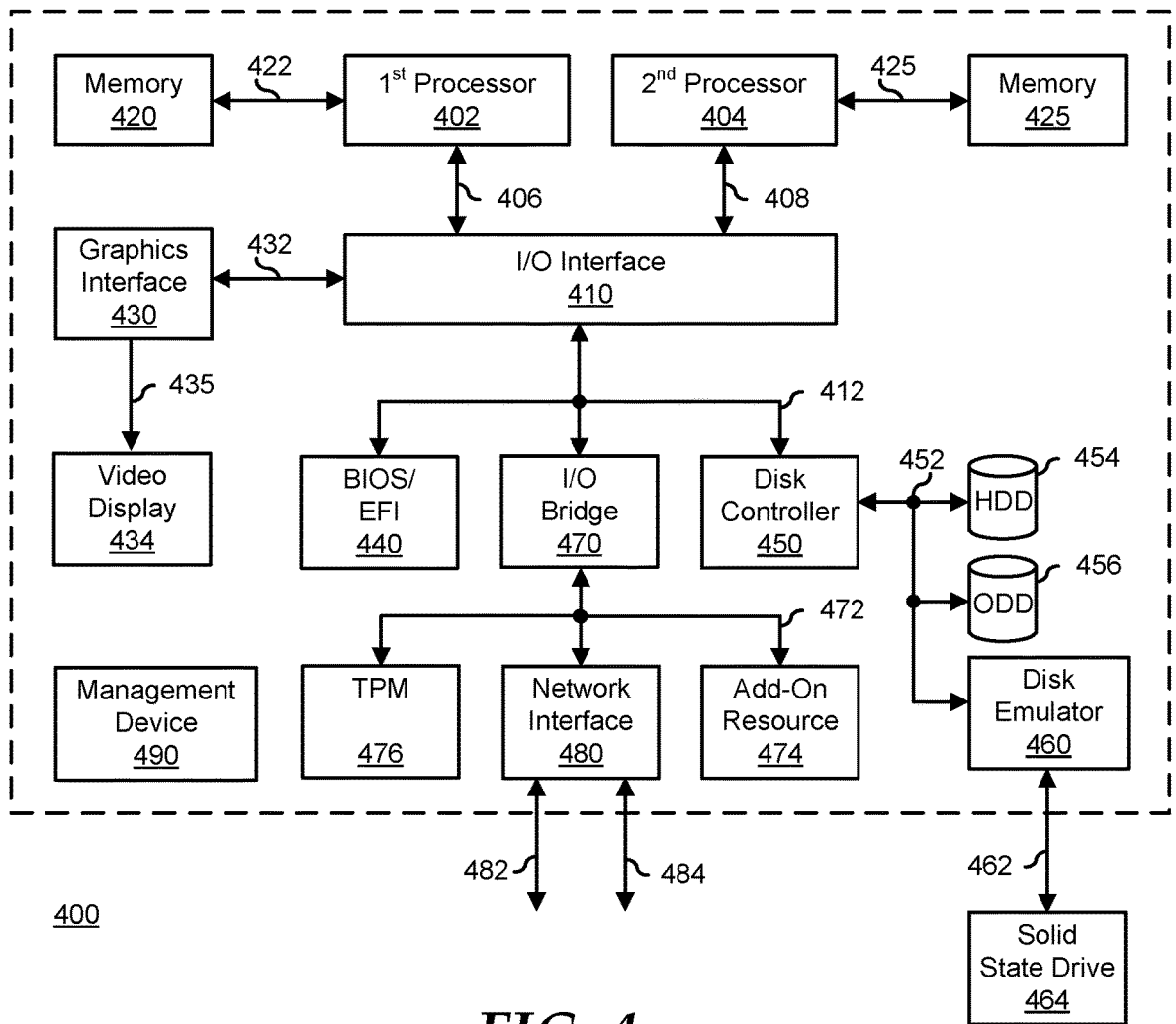
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
    a protected memory to store a revoked versions list;
    a processor configured to modify a revoked firmware version of a first firmware image in the revoked versions list; and
    a basic input/output system (BIOS), the BIOS configured to:
        initialize a firmware update for a firmware image having a firmware version;
        scan the revoked versions list for the firmware version of the firmware image; and
        in response to the firmware version not being located within the revoked versions list, the BIOS further configured to:
            complete the firmware update;
            determine whether a firmware version number for a new revoked firmware version is included in the firmware update, wherein the new revoked firmware version is a previous firmware version, wherein multiple firmware updates occurred between the previous firmware version and the firmware update; and
            in response to the firmware version number for the new revoked firmware version being included in the firmware update, add an entry in the revoked versions list, the entry being associated with the firmware version number for the new revoked firmware version included in the firmware update.

2. The information handling system of claim 1, wherein the processor further configured to:
    receive a notification of a firmware version vulnerability associated with a first firmware version;
    create a new entry for the first firmware version; and
    add the new entry to the revoked versions list.

3. The information handling system of claim 2, wherein the new entry is signed by a private key prior to being added to the revoked versions list.

4. The information handling system of claim 1, wherein the scan of the revoked versions list is performed by a signed update utility.

5. The information handling system of claim 1, wherein the new revoked firmware version in the firmware update is for versions prior to a current firmware image.

6. The information handling system of claim 1, wherein the new revoked firmware version has a security vulnerability.

7. The information handling system of claim 1, wherein the new revoked firmware version is stored in a unified extensible firmware interface variable.

8. The information handling system of claim 1, in response to the firmware version being located within the revoked versions list, the BIOS further configured to abort the firmware update.

9. A method comprising:
    modifying, by a processor, a revoked firmware version of a first firmware image in a revoked versions list;
    initializing, by a basic input/output system (BIOS), a firmware update for a firmware image having a firmware version;
    scanning, by the BIOS, the revoked versions list for the firmware version of the firmware image; and
    in response to the firmware version not being located within the revoked versions list:
        completing the firmware update;
        determining whether a firmware version number for a new revoked firmware version is included in the firmware update, wherein the new revoked firmware version is a previous firmware version, wherein multiple firmware updates occurred between the previous firmware version and the firmware update; and
        in response to the firmware version number for the new revoked firmware version being included in the firmware update, adding an entry in the revoked versions list, the entry is associated with the firmware version number for the new revoked firmware version included in the firmware update.

10. The method of claim 9, further comprising:
    receiving, by the processor, a notification of a firmware version vulnerability associated with a first firmware version;
    creating, by the processor, a new entry for the first firmware version; and
    adding the new entry to the revoked versions list.

11. The method of claim 10, wherein the new entry is signed by a private key prior to being added to the revoked versions list.

12. The method of claim 9, wherein the scanning of the revoked versions list is performed by a signed update utility within the BIOS.

13. The method of claim 9, wherein the new revoked firmware version in the firmware update is for a current firmware image.

14. The method of claim 9, wherein the new revoked firmware version has a security vulnerability.

15. The method of claim 9, wherein the new revoked firmware version is a unified extensible firmware interface variable.

16. The method of claim 9, wherein in response to the firmware version being located within the revoked versions list:
    aborting the firmware update.

17. A method comprising:
    modifying, by a processor, a revoked firmware version of a first firmware image in a revoked versions list;
    initializing, by a basic input/output system (BIOS), a firmware update for a firmware image having a firmware version;
    scanning, by the BIOS, the revoked versions list for the firmware version of the firmware image;
    if the firmware version is not within the revoked versions list, then:
        completing the firmware update;
        determining whether a firmware version number for a new revoked firmware version is included in the firmware update, wherein the new revoked firmware version is a previous firmware version, wherein multiple firmware updates occurred between the previous firmware version and the firmware update; and if the firmware version number for the new revoked firmware version is in the firmware update, then adding an entry in the revoked versions list, the entry is associated with the firmware version number for the new revoked firmware version included in the firmware update, wherein the new revoked firmware version has a security vulnerability; and if the firmware version is within the revoked versions list, then aborting the firmware update.

18. The method of claim 17, further comprising:

receiving, by the processor, a notification of a firmware version vulnerability associated with a first firmware version;

creating, by the processor, a new entry for the first firmware version; and adding the new entry to the revoked versions list.

19. The method of claim 18, wherein the new entry is signed by a private key prior to being added to the revoked versions list.

20. The method of claim 17, wherein the new revoked firmware version in the firmware update is for versions prior to a current firmware image.

* * * * *